United States Patent [19]

Walz

[11] Patent Number: 4,522,294

[45] Date of Patent: Jun. 11, 1985

[54] METHOD AND APPARATUS FOR GROUPING ITEMS

[75] Inventor: Theo Walz, Neunkirch, Switzerland

[73] Assignee: SIG - Schweizerische Industrie-Gesellschaft, Neuhausen am Rheinfall, Switzerland

[21] Appl. No.: 460,050

[22] Filed: Jan. 21, 1983

[30] Foreign Application Priority Data

Jan. 21, 1982 [CH] Switzerland ............................ 381/82

[51] Int. Cl.³ ........................ B65G 25/00; B65G 47/26
[52] U.S. Cl. ..................................... 198/429; 414/330
[58] Field of Search ............... 198/425, 426, 431, 460, 198/503; 414/125, 131, 330

[56] References Cited

U.S. PATENT DOCUMENTS 3,451,563 6/1969 Luginbuhl ............................ 414/330
4,038,909 8/1977 Preisig ................................. 198/425

FOREIGN PATENT DOCUMENTS 380635 9/1964 Switzerland .
476598 9/1969 Switzerland .
972388 10/1964 United Kingdom ................ 198/503

Primary Examiner—Joseph E. Valenza
Assistant Examiner—Douglas C. Voorhees
Attorney, Agent, or Firm—Spencer & Frank

[57] ABSTRACT

A method of grouping items comprises the steps of advancing the items in an edgewise supported, upright oriented, face-to-face series on a supply conveyor; and advancing the items from the supply conveyor on a receiving trough for forming thereon an item stack of a predetermined length measured parallel to the advance of articles on the receiving trough. Further, simultaneously with the last-named step, a collector slide is advanced on the receiving trough in engagement with a leading item of the article stack. The length of each item stack is determined jointly by first signals representing the length of travel of the collector slide on the receiving trough and by second signals representing the number of items on the receiving trough.

5 Claims, 4 Drawing Figures

METHOD AND APPARATUS FOR GROUPING ITEMS

BACKGROUND OF THE INVENTION

This invention relates to a method and an apparatus for grouping items, particularly baked goods such as biscuits or cookies which are advanced in edgewise orientation on a supply conveyor to a receiver for forming groups in order to further advance the items in groups to a processing machine (such as a packaging machine).

It is known to group flat items such as biscuits which are advanced in a trough in an upright edgewise orientation. Thus, in Swiss Pat. No. 476,598 there is described an apparatus by means of which biscuit stacks of predetermined length are separated from the lower, leading end of an article column advanced in an inclined trough. For this purpose, the apparatus includes components which, when the predetermined length of the item group on a pusher is reached, penetrate into the stack and retain the same, while the biscuits lowered further by means of the pusher are grasped by a gripper for advancing them for further processing.

A further apparatus of the above type is disclosed in Swiss Pat. No. 380,635. With the aid of a collector slide, edgewise oriented biscuits are, from a supply trough, accumulated in a receiving trough. After a predetermined stack length of the separated group is reached, a separator slide is introduced between the last biscuit of the group and the leading biscuit of the column.

The above-outlined known apparatus require that the thickness of the individual biscuits be practically identical. This further requires that the apparatus be readjusted every time a different type of biscuit is to be handled thereby. In case of layer-like (sandwich-like) biscuits which are formed of two discs with a cream layer therebetween, the thickness variations are of such a magnitude that damaging (breaking) of biscuits is very likely whether group measurement is effected by counting items or by measuring the stack lengths.

SUMMARY OF THE INVENTION

It is an object of the invention to provide an improved method and apparatus of the above-outlined type which ensure that even in case of articles of non-uniform thickness there may be formed stacks of equal number and of at least approximately uniform lengths and wherein the separation between a measured group and the supplied stack is consistently effected precisely between two articles.

This object and others to become apparent as the specification progresses, are accomplished by the invention, according to which, briefly stated, the length of the group is determined, on the one hand, by means of signals representing the path of displacement of the collector slide forming the group and, on the other hand, by means of signals representing the number of the articles situated on the article receiver.

DESCRIPTION OF THE PREFERRED EMBODIMENT

Figure 1:
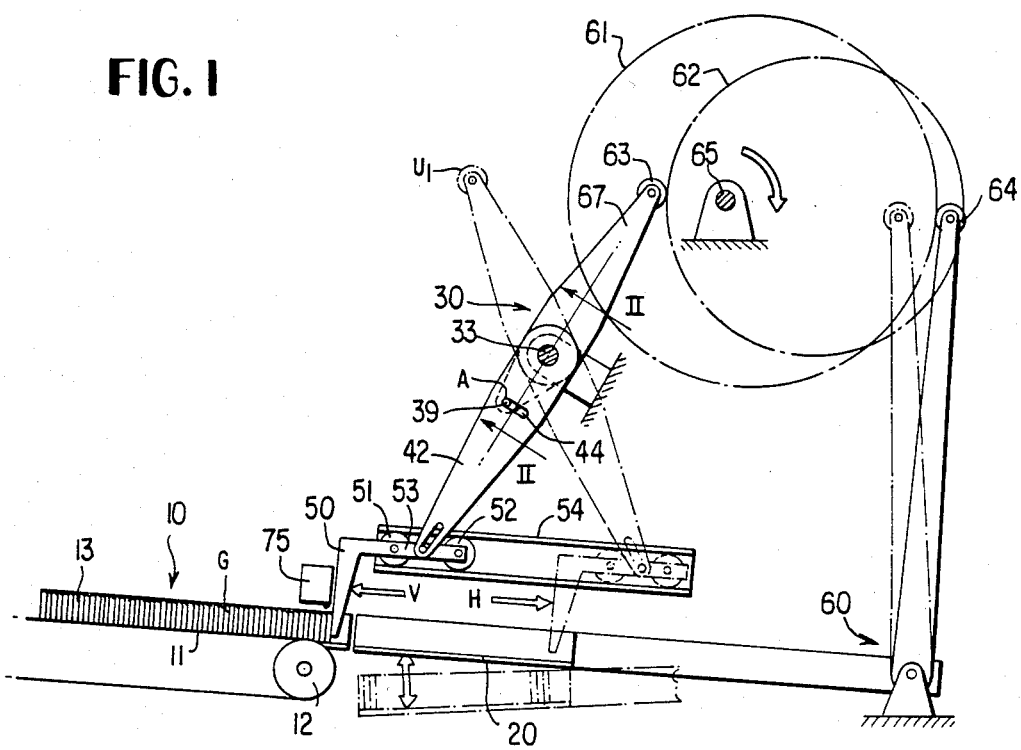
FIG. 1 is a schematic side elevational view of a preferred embodiment of the invention.
Figure 2:
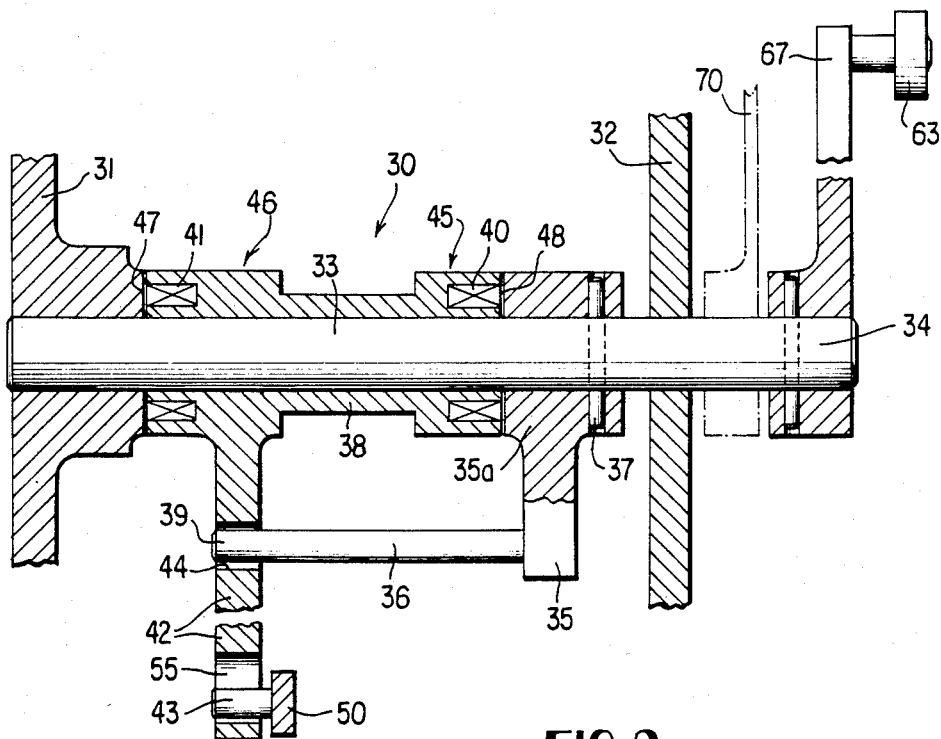
FIG. 2 is a sectional view taken along line II—II of FIG. 1.

Turning now to FIGS. 1 and 2, on a supply conveyor 10 comprising an endless conveyor belt 11 which is trained about an end roller 12 and whose upper reach cooperates with a supply trough 13, articles G such as edgewise oriented biscuits are advanced from the left towards the right as viewed in FIG. 1. At the downstream end of the supply trough 13 the items G move onto a receiving trough 20 behind a collector slide 50. The latter, controlled by a control lever system 30 in a manner to be described in detail below, travels through a path of predetermined length on the receiving trough 20 in order to form a group composed of a predetermined number of articles G. The receiving trough 20 is provided with a drive system 60 by means of which the charged receiving trough 20 is movable to a position in which articles are removed therefrom for further processing, for example, for advancing the articles to a packaging machine. The removal of the articles from the receiving trough 20 may be effected in a known manner by means of lateral displacement or by means of grasping tongs or by spreading apart two lateral guide members. This removal station has no bearing on the invention and is therefore not described in more detail. During standstill- and return phase of the collector slide 50 in the direction of arrow V the trough 20 is lowered by means of the collected group to another conveyor (not shown). In the meantime, until the begin of a next cycle the trough 20 is lifted up to the starting position.

The collector slide 50 is attached to a carriage 53 on which there are mounted two rollers 51 and 52 travelling in a guide track 54, whereby the collector slide 50 executes a back-and-forth movement. To the carriage 53 there is jointed the control lever system 30. The latter and the drive system 60 for moving the receiving trough 20 are controlled by respective cam discs 61 and 62 e.g. with guiding grooves engaged by follower rollers 63 and 64 associated with the systems 30 and 60, respectively. The cam discs 61 and 62 are both affixed to the same drive shaft 65 to ensure that the motion of the collector slide 50 and that of the receiving trough 20 occur in synchronism with one another. While the cam discs 60 and 61 are depicted as simple discs of circular configuration, they may have, as is known to any one skilled in the art, any other form or may be discs with guiding grooves.

The control lever system 30 comprises a shaft 33 which is rotatably supported on bearing brackets 31 and 32 forming part of the machine frame and whose one end 34 is extended outwardly beyond the bearing bracket 32. A follower lever 67 is affixed to the end 34 of the shaft 33 and carries at its end the follower roller 63.

Between the two bearing brackets 31 and 32 there is situated a drive lug 35, whose hub 35a is rigidly affixed to the shaft 33 by means of a pin 37 and which carries a drive bar 36. To opposite ends of a sleeve-like hollow shaft 38 there are rigidly affixed electromagnets 45 and 46 having respective solenoids 40 and 41. To the hollow shaft 38 there is also affixed a driven lever 42 which, in turn, drives a coupling pin 43 by means of an oblong hole 55 in the lever 53 of collector slide 50.

The inner face of the bearing bracket 31 constitutes an armature plate 47 for the electromagnet 46 and similarly, that face of the drive lug hub 35a which adjoins the solenoid 40 constitutes an armature plate 48 for the electromagnet 45. Thus, if the solenoid 40 is energized, the electromagnet 45 is magnetically clamped to the lug hub 35a and if the solenoid 41 is energized, the electromagnet 46 is magnetically clamped to the bearing bracket 31. The electromagnet 45 together with the hub 35a and the electromagnet 46 together with the bearing bracket 31 form two electromagnetic clutches.

The drive bar 36 terminates in a drive pin 39 which projects into an arcuate oblong slot 44 provided in the driven lever 42. The slot 44 permits the drive pin 39 to execute a relative motion with respect to the driven lever 42.

Upon energization of the electromagnet 45 and simultaneous de-energization of the electromagnet 46 the collector slide 50 is moved in accordance with the control curve of the cam disc 62 in the direction of arrows H or V. If, on the other hand, the electromagnet 45 is de-energized and, at the same time, the electromagnet 46 is energized, the entire hollow shaft 38 and thus the driven lever 42 is blocked, the collector slide 50 is at a standstill and the drive pin 39 executes a relative motion with respect to the driven lever 42 within the slot 44 in case a switching of the electromagnets 45 and 46 has not occurred before the system of the control motion has reached the reversal point U1. Lever 42 and slide 50 are stopped in the motion in the direction of arrow H. Lever 67 moves until it reaches the reversal point U1 of the cam disc 62, where the pin 39 starts moving out of its standby position A in the slot 44.

At the beginning of reversal motion in the direction of arrow V the cam switch 80 interrupts the exciting current to coil 41 of brake 46 and pin 39 is returned to position A in the slot 44 for driving lever 42 and collector slide 50 into the position of FIG. 1. Due to the sloped guide track 54 the collector slide 50 and lever 42 are drawn by gravitation force in the direction of arrow H. This could be amplified by use of a spring.

Figure 3:
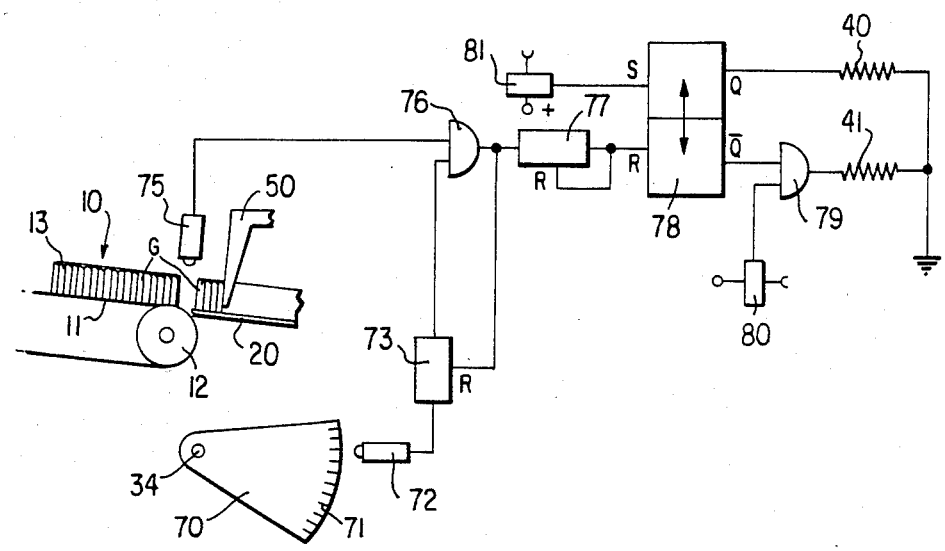
FIG. 3 is a block diagram of a control system forming part of the preferred embodiment.

Turning now to FIG. 3, there is shown a block diagram for the automatic control of both electromagnets 45 and 46 as a function of the path which the collector slide 50 has travelled on the receiving trough 20 and the number of articles which have been pushed onto the receiving trough 20.

For example, on the shaft 33 or to its extension 34 a circular sector-shaped plate 70 may be affixed which is provided with equidistant radial markings 71 for aiding in generating signals representing incremental lengths of displacement of the collector slide 50. A length pulse generator 72 which, in case of a toothed configuration of the marking 71 may be a mechanically operated switch or, in case of a light reflecting design of the markings 71, may be a photoelectric sensor is connected with the signal input of a presettable length counter 73 for determining the thickness of an article. Thus, the length pulse generator 72 transmits signals representing the distance travelled by the collector slide 50.

Figure 4:
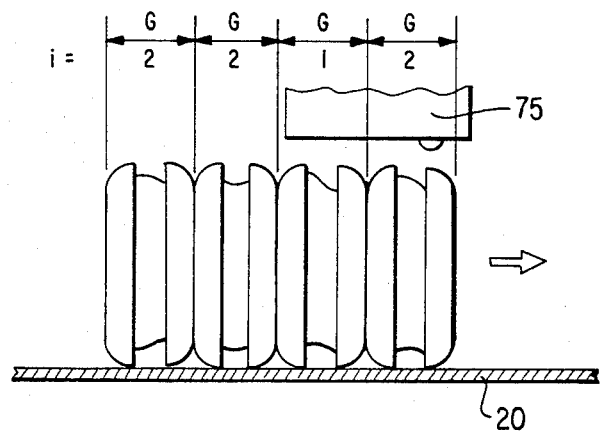
FIG. 4 is an explanatory detail of FIG. 3.

A second pulse generator 75 is provided at the transfer location where the articles pass from the supply conveyor 10 to the receiving trough 20. The pulse generator 75 may be a photoelectric device to sense the passage of two successive articles by means of a beam penetrating into the clearance between the two articles. FIG. 4 shows a configuration with articles G in form of sandwiched cookies of different form and the pulses i generated by the pulse generator 75. The output of the pulse generator 75 and the output of the length counter 73 are applied to the input of an AND gate 76. The output of the AND gate 76 is connected with the input of a presettable article counter 77 whose output is connected with the reset input R of a bistable multivibrator 78. The setting input S of the multivibrator 78 is connected with a switch 81 adapted to generate a logic 1 pulse. The direct output Q of the multivibrator 78 is connected with one terminal of the solenoid 40 and the inverting output $\overline{Q}$ of the multivibrator 78 is connected to one input of a further AND gate 79 whose output is connected to one terminal of the solenoid 41. The second input of the AND gate 79 is connected with a switch 80 through which normally a logic 1 is passed and which, upon actuation, transmits a logic 0. For resetting the length counter 73, its resetting input R is connected with the output of the AND gate 76. The article counter 77 is reset by its output; for this purpose this output is connected directly with the resetting input R of the article counter 77.

As the cam dics 61 and 62 rotate, in an initial position of the collector slide 50 the bistable multivibrator 78 is set by means of the switch 81 and thereby the solenoid 40 is energized and the solenoid 41 is de-energized. The driven lever 42 is thus moved by the follower 63 engaging the cam disc 62. As a result, the collector slide 50 moves towards the right as viewed in FIG. 1 and thus articles G are transferred onto the receiving trough 20 behind the moving collector slide 50. The plate 70 moves in unison with the shaft 33 as the latter is rotated by the follower lever 67, and each time a mark 71 on the plate 70 is sensed by the length pulse generator 72, it transmits a pulse which is counted in the length counter 73 as soon as the counting value in the length counter 73 has reached a set value which corresponds to the thickness of the articles G. The output pulse generated by the length counter 73 sets the AND gate 76 so that a signal from the pulse generator 75 which senses the gap between two articles, is passed by the AND gate 76. The transmitted pulse resets the length counter 73 and sets the article counter 77 one counting step further. As a result, a counting pulse can be transmitted only when the transmitter 75 senses the end of an article; this takes into account irregularly shaped articles. The output pulse from the article counter 77 which corresponds to a given number of articles G is applied to the reset input R of the bistable multivibrator 78. As a result, the latter assumes its second state, whereby the solenoid 40 is de-energized and the solenoid 41 is energized. This blocks (immobilizes) the hollow shaft 38 and thus also the driven lever 42 while the follower 63 may continue its motion to the end by virtue of the drive pin 39 moving in slot 44 of the driven lever 42.

As is well known in the art, there is a retaining means (not shown) at the end of conveyor belt 11 for retaining the leading articles by means of a small force applied from the sides of the conveyor belt 11 for the articles may not advance and fall down without the collector slide 50 in its upper position.

A second switch 80 serves for de-energizing the solenoid 41 while the solenoid 40 is de-energized during the return motion of the collector slide 50 in order to take up again the play which was obtained during the remaining advance of the follower lever 67.

It will be understood that the above description of the present invention is susceptible to various modifications, changes and adaptations, and the same are intended to be comprehended within the meaning and range of equivalents of the appended claims.

What is claimed is:

1. An apparatus for grouping items comprising
   (a) a supply conveyor for advancing items in an edgewise supported, upright oriented face-to-face series; said supply conveyor having a discharge end;
   (b) a receiving trough adjoining said discharge end of said supply conveyor for receiving items from said supply conveyor; said receiving trough having a length;
   (c) a collector slide arranged for movement on said receiving trough along the length thereof for controlling the admission of items from said supply conveyor to said receiving trough;
   (d) a drive mechanism for moving said collector slide;
   (e) a lever system connecting said drive mechanism with said collector slide; said lever system including electromagnetic clutch means for operatively coupling said collector slide to or disconnecting said collector slide from said drive mechanism; and
   (f) a control system operatively connected with said electromagnetic clutch means; said control system including
      (1) switch means connected to said electromagnetic clutch means;
      (2) item counting means for counting items on said receiving trough and generating a counting signal, said counting means being connected to said switch means for applying to said switch means said counting signals; and
      (3) length sensing means generating length signals representing the length of path travelled by said collector slide on said receiving trough; said length sensing means being connected to said switch means for applying to said switch means said length signals; said switch means controlling said electromagnetic clutch means as a function of said counting signals and said length signals.

2. An apparatus as defined in claim 1, wherein said lever system comprises
   (a) a shaft rotatably supported in a machine frame;
   (b) a follower lever affixed to said shaft and operatively connected to said drive mechanism; and
   (c) a driven lever mounted on said shaft and being rotatable relative thereto; said driven lever being coupled to said collector slide; said electromagnetic clutch means being carried on said shaft and having a first state in which said electromagnetic clutch means rigidly couples said driven lever to said shaft for rotation therewith as a unit and a second state in which said electromagnetic clutch means disconnects said driven lever from said shaft for allowing a relative rotation between said shaft and said driven lever.

3. An apparatus as defined in claim 2, wherein said electromagnetic clutch means comprises
   (a) a first electromagnetic clutch including a first solenoid assembly mounted on said shaft and being rigidly affixed to said driven lever and being rotatable relative to said shaft; and a hub member fixedly secured to said shaft adjacent said first solenoid assembly; said first solenoid assembly being electrically connected to said switch means; in said first state of said electromagnetic clutch means said first solenoid assembly being energized whereby said first solenoid assembly is magnetically clamped to said hub member for force-transmittingly coupling said follower lever to said driven lever; in said second state of said electromagnetic clutch means said first solenoid assembly being de-energized; and
   (b) a second electromagnetic clutch including a second solenoid assembly mounted on said shaft adjacent a part of the machine frame and being rigidly affixed to said driven lever and being rotatable relative to said shaft; said second solenoid assembly being electrically connected to said switch means; in said first state of said electromagnetic clutch means said second solenoid assembly being de-energized; in said second state of said electromagnetic clutch means said second solenoid assembly being energized whereby said second solenoid assembly is magnetically clamped to said part of said machine frame for immobilizing said driven lever.

4. An apparatus as defined in claim 3, further comprising means defining an opening in said driven lever and a drive pin affixed to said hub member and extending into said opening; said drive pin moving with said shaft as a unit.

5. An apparatus as defined in claim 4, wherein said opening is a slot extending parallel to the direction of motion of said guide pin, whereby said guide pin is movable in said slot relative to said driven lever.

* * * * *